(12) United States Patent
Mitsui et al.

(10) Patent No.: US 10,271,255 B2
(45) Date of Patent: Apr. 23, 2019

(54) BASE STATION

(71) Applicant: KYOCERA CORPORATION, Kyoto-shi, Kyoto (JP)

(72) Inventors: Katsuhiro Mitsui, Kawasaki (JP); Masato Fujishiro, Yokohama (JP); Kugo Morita, Yokohama (JP); Yushi Nagasaka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 106 days.

(21) Appl. No.: 15/467,284

(22) Filed: Mar. 23, 2017

(65) Prior Publication Data

US 2017/0195931 A1 Jul. 6, 2017

Related U.S. Application Data

(63) Continuation of application No. PCT/JP2015/076886, filed on Sep. 24, 2015.

(30) Foreign Application Priority Data

Sep. 26, 2014 (JP) ................................ 2014-197611

(51) Int. Cl.
*H04W 36/22* (2009.01)
*H04W 28/08* (2009.01)
(Continued)

(52) U.S. Cl.
CPC ........... *H04W 36/22* (2013.01); *H04W 28/08* (2013.01); *H04W 36/0061* (2013.01);
(Continued)

(58) Field of Classification Search
CPC ..... H04W 28/08; H04W 36/14; H04W 36/22; H04W 48/08; H04W 48/18; H04W 48/12; H04W 88/08; H04W 92/20
See application file for complete search history.

(56) References Cited

U.S. PATENT DOCUMENTS

2006/0133330 A1* 6/2006 Chin ................. H04W 48/18
370/338
2007/0224988 A1 9/2007 Shaheen
(Continued)

FOREIGN PATENT DOCUMENTS

JP 2011-517186 A 5/2011
WO 2009120898 A2 10/2009
(Continued)

OTHER PUBLICATIONS

Office Action dated Jul. 11, 2017, issued for Japanese Patent Application No. 2016-550349 by Japan Patent Office with English concise explanation.
(Continued)

*Primary Examiner* — Mewale A Ambaye

(57) ABSTRACT

A base station according to a present embodiment includes: a controller configured to set first determination parameters used for a radio terminal to determine whether to switch a standby destination or a connection destination between the mobile communication network and a wireless LAN; a transmitter configured to transmit the first determination parameters to a radio terminal served by the base station; and a receiver configured to receive information notified from another base station. The controller is configured to set the first determination parameters in consideration of the information.

3 Claims, 7 Drawing Sheets

(51) Int. Cl.
| | |
|---|---|
| *H04W 36/14* | (2009.01) |
| *H04W 48/08* | (2009.01) |
| *H04W 48/18* | (2009.01) |
| *H04W 92/20* | (2009.01) |
| *H04W 36/00* | (2009.01) |
| *H04W 84/12* | (2009.01) |
| *H04W 88/08* | (2009.01) |

(52) U.S. Cl.
CPC ..... *H04W 36/00835* (2018.08); *H04W 36/14* (2013.01); *H04W 48/08* (2013.01); *H04W 48/18* (2013.01); *H04W 92/20* (2013.01); *H04W 84/12* (2013.01); *H04W 88/08* (2013.01)

(56) References Cited

U.S. PATENT DOCUMENTS

| | | | |
|---|---|---|---|
| 2009/0245176 A1* | 10/2009 | Balasubramanian | H04W 48/20 370/328 |
| 2010/0198968 A1* | 8/2010 | Singh | H04W 12/08 709/225 |
| 2014/0079022 A1* | 3/2014 | Wang | H04W 36/22 370/331 |
| 2016/0014680 A1 | 1/2016 | Jang et al. | |

FOREIGN PATENT DOCUMENTS

| | | |
|---|---|---|
| WO | 2014/043500 A1 | 3/2014 |
| WO | 2014133359 A1 | 4/2014 |

OTHER PUBLICATIONS

3rd Generation Partnership Project, "Technical Specification Group Radio Access Network; Evolved Universal Terrestrial Radio Access (E-UTRA); User Equipment (UE) procedures in idle mode (Release 12)", 3GPP TS 36.304 V12.1.0, Jun. 2014, pp. 1-35.

Intel Corporation, "LTE/UMTS/WLAN load blancing", 3GPP TSG-RAN3 Meeting #85, R3-141859, Aug. 2014, pp. 1-2, Dresden, Germany.

3rd Generation Partnership Project, "Technical Specification Group Radio Access Network; Evolved Universal Terrestrial Radio Access (E-UTRA); User Equipment (UE) procedures in idle mode (Release 12)", 3GPP TS 36.304 V12.2.0, Sep. 2014, pp. 28-32.

Alcatel-Lucent et al., "RAN parameters for traffic steering", 3GPP TSG-RAN WG RAN3#85, R2-140715, Feb. 2014, pp. 1-6, Prague, Czech Republic.

International Search Report (Form PCT/ISA/210) issued for PCT/JP2015/076886, dated Dec. 15, 2015.

Office Action dated Feb. 21, 2017 and issued for corresponding Japanese Patent Application No. 2016-550349 by Japanese Patent Office.

* cited by examiner

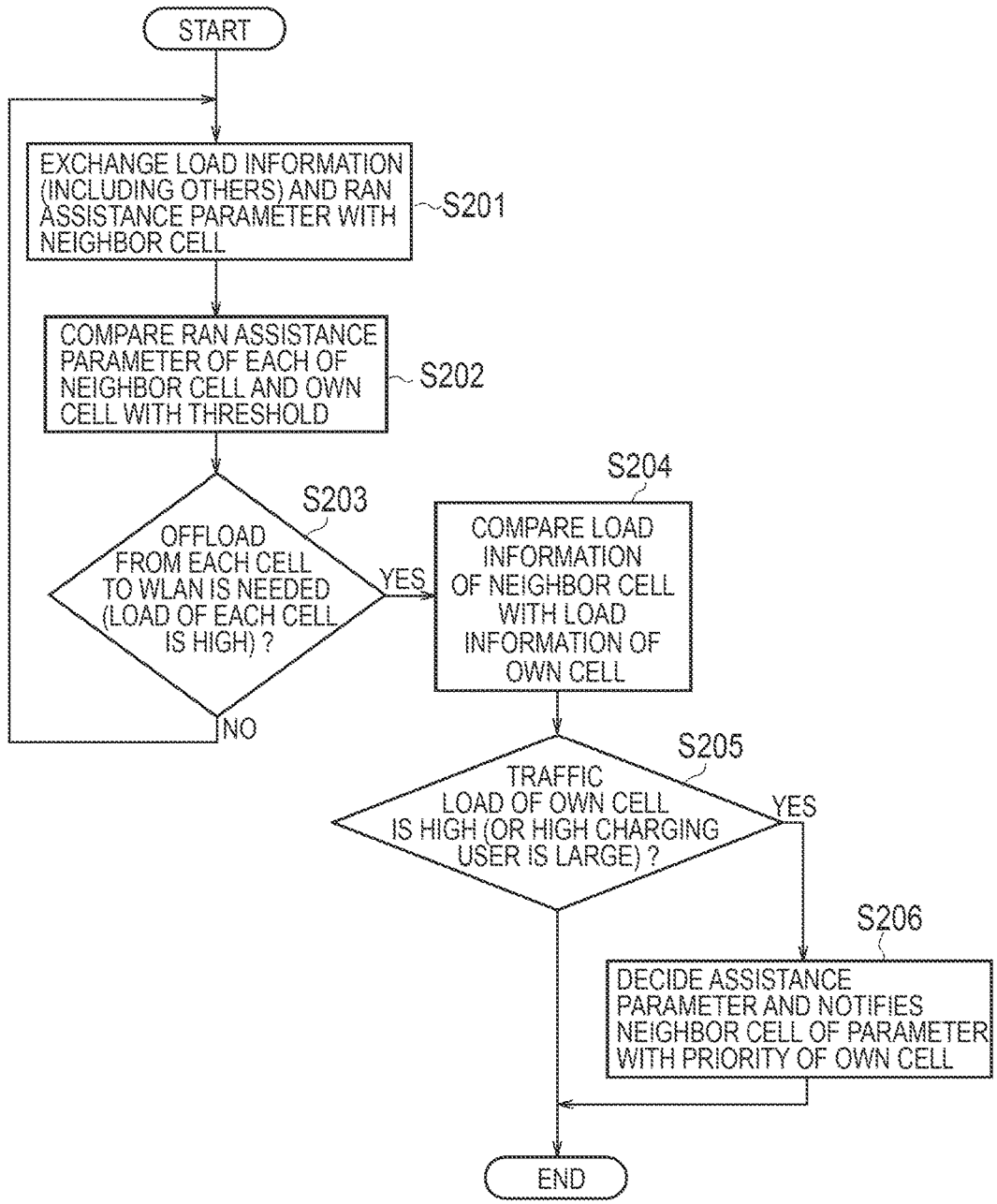

BASE STATION

RELATED APPLICATIONS

This application is a continuation application of international application No. PCT/JP2015/076886, filed Sep. 24, 2015, which claims benefit of Japanese patent application No. 2014-197611, filed Sep. 26, 2014, the entirety of both applications hereby expressly incorporated by reference.

TECHNICAL FIELD

The present disclosure relates to a base station used in a system that performs a switching process for switching a standby destination or a connection destination between a coverage area of a mobile communication network and a coverage area of a wireless LAN.

BACKGROUND ART

In the past, switching process (network selection or and traffic steering) has been proposed. In a case where at least one part of a coverage area of a mobile communication network as represented by LTE (Long Term Evolution) and a coverage area of a wireless LAN are overlapped, the switching process switches a standby destination or a connection destination between the mobile communication network and the wireless LAN. To be more specific, a radio terminal performs the switching process on whether first information of the mobile communication network satisfies a first condition and whether second information of the wireless LAN satisfies a second condition.

Here, the first information of the mobile communication network includes a measurement result (RSRPmeas) of signal level of received signal (RSRP; Reference Signal Received Power) and a measurement result (RSRQmeas) of signal quality of received signal (RSRQ; Reference Signal Received Quality), for example. The second information of the wireless LAN includes a channel utilization value of the wireless LAN, a backhaul value of the wireless LAN, and a signal strength of received signal (RSSI; Received Signal Strength Indicator), for example.

Meanwhile, determination parameters are notified from a base station included in the mobile communication network to a radio terminal. The determination parameters are used for the radio terminal to determine whether to switch a standby destination or a connection destination between the mobile communication network and the wireless LAN. There are dedicated parameters notified to each radio terminal individually and broadcast parameters broadcasted to radio terminals, as the determination parameters.

PRIOR ART DOCUMENTS

Non Patent Document

[Non Patent Document 1] 3GPP technical specification "TS 36.304 V12.1.0"

SUMMARY

A base station according to an embodiment is included in a mobile communication network. The base station includes: a controller configured to set first determination parameters used for a radio terminal to determine whether to switch a standby destination or a connection destination between the mobile communication network and a wireless LAN; a transmitter configured to transmit the first determination parameters to a radio terminal served by the base station; and a receiver configured to receive information notified from another base station. The controller is configured to set the first determination parameters in consideration of the information.

A base station according to an embodiment is included in a mobile communication network. The base station includes: a controller configured to set first determination parameters used for a radio terminal to determine whether to switch a standby destination or a connection destination between the mobile communication network and a wireless LAN; and a transmitter configured to transmit the first determination parameters to a radio terminal served by the base station. The controller is configured to transmit, to another base station, a priority related to the first determination parameters, together with the first determination parameters.

A base station according to an embodiment is included in a mobile communication network. The base station includes: a transmitter configured to transmit, to a radio terminal served by the base station, first AP information including an AP identifier indicating a wireless LAN access point which exists within a coverage area of a cell managed by the base station and to which a connection is recommended; a receiver configured to receive, from another base station that manages another cell, second AP information including an AP identifier indicating a wireless LAN access point which exists within a coverage area of the another cell managed by the another base station; and a controller configured to specify a predetermined AP identifier commonly included in the first AP information and the second AP information.

A base station according to an embodiment is included in a mobile communication network. The base station includes: a transmitter configured to transmit AP information including identifiers indicating wireless LAN access points within coverage of a cell managed by the base station, to a radio terminal within the cell; and a controller configured to perform a control to transmit at least one identifier included in the AP information to another base station that manages another cell.

BRIEF DESCRIPTION OF DRAWINGS

FIG. 7 is a flowchart illustrating an example of operation of the radio base station 100 according to a present embodiment.

DESCRIPTION OF EMBODIMENTS

[Overview of Embodiments]

Figure 1:
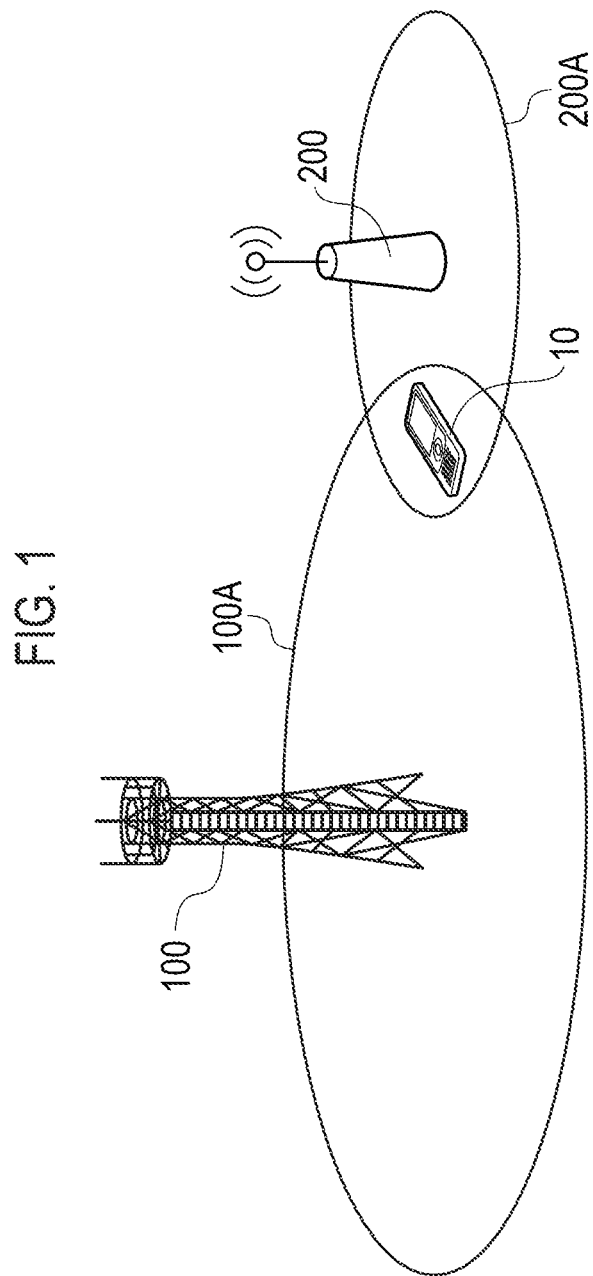
FIG. 1 is a diagram illustrating a communication system 1 according to each embodiment.

Here, a case where a wireless LAN access point (Hereinafter, AP) included in a wireless LAN exists in an overlapping portion between a coverage area of a cell managed by a first base station and a coverage area of a cell managed by a second base station will be assumed.

In this case, for example, in order to reduce the load of the first base station, the first base station changes determination parameters such that it becomes difficult for a radio terminal to connect to the first base station, and then transmits the changed determination parameters to radio terminals served by the first base station (a). Thereby, at least one of radio terminals connected to the first base station switches the connection destination to the wireless LAN (to be more specific, the AP), based on the changed determination parameters (b). At least one of radio terminals, in which communication status becomes worse due to increasing connections of the wireless LAN, switches the connection destination to a mobile communication network (to be more specific, the second base station), based on the determination parameters (c). Thereby, the second base station, in which the load of the second base station increases, changes determination parameters such that it becomes difficult for the radio terminal to connect to the second base station, and then transmits the changed determination parameters to radio terminals served by the second base station (d). At least one of radio terminals connected to the second base station switches the connection destination to the wireless LAN (the AP), based on the changed determination parameters (e). At least one of radio terminals, in which communication status becomes worse due to increasing connections of the wireless LAN, switches the connection destination to the mobile communication network (to be more specific, the first base station), based on the determination parameters (f). Thereby, the first base station, in which the load of the first base station increases, changes determination parameters such that it becomes difficult for the radio terminal to connect to the first base station, and then transmits the changed determination parameters to radio terminals served by the first base station (a'). At least one of radio terminals connected to the first base station switches the connection destination to the wireless LAN (the AP), based on the changed determination parameters (b'). By repeating such a sequence of operations, an inefficient operation (so-called, ping-pong phenomenon), in which the radio terminal alternately repeats the switching of standby destination or connection destination between the mobile communication network and the wireless LAN, may occur Therefore, the objective of embodiments is to enable the reduction of inefficient operation in which the radio terminal alternately repeats the switching of standby destination or connection destination between the mobile communication network and the wireless LAN.

A base station according to a first embodiment is included in a mobile communication network. The base station includes: a controller configured to set first determination parameters used for a radio terminal to determine whether to switch a standby destination or a connection destination between the mobile communication network and a wireless LAN; a transmitter configured to transmit the first determination parameters to a radio terminal served by the base station; and a receiver configured to receive information notified from another base station. The controller is configured to set the first determination parameters in consideration of the information.

In the first embodiment, the information includes second determination parameters set by the another base station. The second determination parameters are determination parameters used for the radio terminal to determine whether to switch a standby destination or a connection destination between the mobile communication network and the wireless LAN.

In the first embodiment, the information includes at least one of load information, subscriber information, and operator information in the another base station.

In the first embodiment, if the second determination parameters are prioritized over the first determination parameters, the controller is configured to set the first determination parameters in consideration of the second determination parameters.

In the first embodiment, if the second determination parameters are parameters that prompt a switch to the wireless LAN, the controller is configured to set parameters that refrain from a switch to the wireless LAN as the first determination parameters.

In the first embodiment, the parameters that prompt the switch to the wireless LAN include: a mobile communication network side threshold having a value higher than a predetermined value; or a wireless LAN side threshold having a value lower than a predetermined value. The parameters that refrain from the switch to the wireless LAN include: a mobile communication network side threshold having a value lower than a predetermined value; or a wireless LAN side threshold having a value higher than a predetermined value.

In the first embodiment, the controller is configured to perform a control to transmit a priority of the first determination parameters to the another base station.

In the first embodiment, the controller is configured to perform a control to transmit: a relative priority of the first determination parameters compared with the second determination parameters; or an absolute priority of the first determination parameters, to the another base station.

In the first embodiment, the controller is configured to perform a control to transmit timer information indicating a duration of the priority, together with the priority.

In the first embodiment, the controller is configured to determine the priority based on load information of the base station and load information of the another base station.

In the first embodiment, the controller is configured to determine the priority based on subscriber information related to contents of contract of the radio terminal.

In the first embodiment, the controller is configured to determine the priority based on information indicating a base station which an operator gives priority to.

In the first embodiment, the controller is configured to acquire load information of a wireless LAN access point within a coverage area of an cell managed by the base station, and to set the first determination parameters based on the load information of the wireless LAN access point.

In the first embodiment, the controller is configured to acquire AP information including an AP identifier of a wireless LAN access point within a coverage area of another cell managed by the another base station. If the controller discovers a wireless LAN access point in an overlapping portion between a coverage area of the cell managed by the base station and a coverage area of the another cell managed by the another base station, the controller is configured to set the first determination parameters in consideration of the second determination parameters.

A base station according to a first embodiment is included in a mobile communication network. The base station includes: a controller configured to set first determination parameters used for a radio terminal to determine whether to switch a standby destination or a connection destination between the mobile communication network and a wireless LAN; and a transmitter configured to transmit the first determination parameters to a radio terminal served by the base station. The controller is configured to transmit, to another base station, a priority related to the first determination parameters, together with the first determination parameters.

In the first embodiment, the priority related to the first determination parameters is determined based on information notified from another base station.

In the first embodiment, the priority related to the first determination parameters is information used for the another base station to set second determination parameters. The second determination parameters are used for the radio terminal to determine whether to switch a standby destination or a connection destination between the mobile communication network and the wireless LAN.

A base station according to a second embodiment is included in a mobile communication network. The base station includes: a transmitter configured to transmit, to a radio terminal served by the base station, first AP information including an AP identifier indicating a wireless LAN access point which exists within a coverage area of a cell managed by the base station and to which a connection is recommended; a receiver configured to receive, from another base station that manages another cell, second AP information including an AP identifier indicating a wireless LAN access point which exists within a coverage area of the another cell managed by the another base station; and a controller configured to specify a predetermined AP identifier commonly included in the first AP information and the second AP information.

In the second embodiment, the controller is configured to perform a control to delete the predetermined AP identifier from the first AP information.

In the second embodiment, if the another base station is prioritized over the base station, the controller is configured to perform a control to delete the predetermined AP identifier from the first AP information.

In other embodiments, the transmitter is configured to transmit, to the radio terminal, exclusion information for excluding the predetermined AP identifier from the first AP information retained by the radio terminal.

In other embodiments, the transmitter is configured to transmit, to the radio terminal, at least one of first determination parameters and second determination parameters. The first determination parameters are determination parameters associated with the predetermined AP identifier, and used for the radio terminal to determine whether to switch a standby destination or a connection destination between the mobile communication network and the wireless LAN. The second determination parameters are determination parameters associated with AP identifier in the first AP information other than the predetermined AP identifier, and used for the radio terminal to determine whether to switch a standby destination or a connection destination between the mobile communication network and the wireless LAN.

A base station according to a second embodiment and other embodiments is included in a mobile communication network. The base station includes: a transmitter configured to transmit AP information including identifiers indicating wireless LAN access points within coverage of an cell managed by the base station, to a radio terminal within the cell; and a controller configured to perform a control to transmit at least one identifier included in the AP information to another base station that manages another cell.

[First Embodiment]
(Communication System)

Hereinafter, a communication system according to a first embodiment will be described. FIG. 1 is a diagram illustrating a communication system 1 according to the first embodiment.

As illustrated in FIG. 1, a communication system 1 includes a radio base station 100 and an access point 200. In addition, the communication system 1 includes a radio terminal 10 capable of connecting with the radio base station 100 or the access point 200.

The radio terminal 10 is a terminal such as a cellular phone or a tablet. The radio terminal 10 has a function of performing radio communications with the access point 200 in addition to a function of performing radio communications with the radio base station 100.

The radio base station 100 has a first coverage area 100A, and provides mobile communication services as represented by LTE (Long Term Evolution) in the first coverage area 100A. The radio base station 100 manages one or more cells, and the first coverage area 100A is formed by the one or more cells. The radio base station 100 is an entity in the mobile communication network. Note that the cell may be a term indicating a geographical area, or may be a function for performing radio communications with the radio terminal 10.

The access point 200 has a second coverage area 200A, and provides wireless LAN services in the second coverage area 200A. The access point 200 is an entity in the wireless LAN. At least part of the second coverage area 200A overlaps with the first coverage area 100A. All of the second coverage area 200A may overlap with the first coverage area 100A. Generally, the second coverage area 200A is smaller than the first coverage area 100A.

(Application Scene)

In the first embodiment, a method for performing a switching process (for example, network selection and traffic steering) for switching a standby destination or a connection destination between the mobile communication network and the wireless LAN by the radio terminal. The radio terminal 10 being in an RRC connected state or an RRC idle state performs the switching process in order to select a network with which the traffic is exchanged, from among the mobile communication network (cellular communication network) and the wireless LAN (WLAN communication network). To be more specific, if the state in which first information of mobile communication network satisfies a first condition and second information of wireless LAN satisfies a second condition continues over a predetermined period, the switching process (for example, network selection and traffic steering) is executed.

In the first embodiment, the switching process includes both of: a process of switching standby destination or connection destination from the mobile communication network to the wireless LAN; and a process of switching standby destination or connection destination from the wireless LAN to the mobile communication network.

Here, the first information of mobile communication network includes a measurement result (RSRPmeas) of signal level of received signal (RSRP; Reference Signal Received Power) and a measurement result (RSRQmeas) of signal quality of received signal (RSRQ; Reference Signal Received Quality), for example.

The second information of wireless LAN includes a channel utilization value of wireless LAN (ChannelUtilizationWLAN), a downlink backhaul value of wireless LAN (BackhaulRateDlWLAN), an uplink backhaul value of wireless LAN (BackhaulRateUlWLAN), and a signal strength of received signal (RSSI; Received Signal Strength Indicator), for example.

(Switching Process from the Mobile Communication Network to the Wireless LAN)

The first condition for switching standby destination or connection destination from the mobile communication network to the wireless LAN is that the following condition (1a) or (1b) is satisfied, for example. However, the first condition may be that all of the following conditions (1a) and (1b) are satisfied.

$$\text{RSRPmeas} < \text{Thresh}_{ServingOffloadWLAN,LowP} \quad (1a)$$

$$\text{RSRQmeas} < \text{Thresh}_{ServingOffloadWLAN,LowQ} \quad (1b)$$

Note that the "$\text{Thresh}_{ServingOffloadWLAN,LowP}$" and "$\text{Thresh}_{ServingOffloadWLAN,LowQ}$" are thresholds provided by the radio base station 100 or previously defined thresholds.

The second condition for switching standby destination or connection destination from the mobile communication network to the wireless LAN is that all of the following conditions (1c) to (1f) are satisfied, for example. However, the second condition may be that one of the following conditions (1c) to (1f) is satisfied.

$$\text{ChannelUtilizationWLAN} < \text{Thresh}_{ChUtilWLAN,Low} \quad (1c)$$

$$\text{BackhaulRateDlWLAN} > \text{Thresh}_{BackhRateDLWLAN,High} \quad (1d)$$

$$\text{BackhaulRateUlWLAN} > \text{Thresh}_{BackhRateULWLAN,High} \quad (1e)$$

$$\text{RSSI} > \text{Thresh}_{BEACONSRSSI,High} \quad (1f)$$

Note that the "$\text{Thresh}_{ChUtilWLAN,Low}$", "$\text{Thresh}_{BackhRateDLWLAN,High}$", "$\text{Thresh}_{BackhRateULWLAN,High}$" and "$\text{Thresh}_{BEACONSRSSI,High}$" are thresholds provided by the radio base station 100 or previously defined thresholds.

(Switching Process from the Wireless LAN to the Mobile Communication Network)

The first condition for switching standby destination or connection destination from the wireless LAN to the mobile communication network is that the following conditions (2a) and (2b) are satisfied, for example. However, the first condition may be that one of the following conditions (2a) and (2b) is satisfied.

$$\text{RSRPmeas} > \text{Thresh}_{ServingOffloadWLAN,HighP} \quad (2a)$$

$$\text{RSRQmeas} > \text{Thresh}_{ServingOffloadWLAN,HighQ} \quad (2b)$$

Note that the "$\text{Thresh}_{ServingOffloadWLAN,HighP}$" and "$\text{Thresh}_{ServingOffloadWLAN,HighQ}$" are thresholds provided by the radio base station 100 or previously defined thresholds.

The second condition for switching standby destination or connection destination from the wireless LAN to the mobile communication network is that one of the following conditions (2c) to (2f) is satisfied, for example. However, the second condition may be that all of the following conditions (2c) to (2f) are satisfied.

$$\text{ChannelUtilizationWLAN} > \text{Thresh}_{ChUtilWLAN,High} \quad (2c)$$

$$\text{BackhaulRateDlWLAN} < \text{Thresh}_{BackhRateDLWLAN,Low} \quad (2d)$$

$$\text{BackhaulRateUlWLAN} < \text{Thresh}_{BackhRateULWLAN,Low} \quad (2e)$$

$$\text{RSSI} < \text{Thresh}_{BEACONSRSSI,High} \quad (2f)$$

Note that the "$\text{Thresh}_{ChUtilWLAN,High}$", "$\text{Thresh}_{BackhRateDLWLAN,Low}$", "$\text{Thresh}_{BackhRateULWLAN,Low}$" and "$\text{Thresh}_{BEACONSRSSI,Low}$" are thresholds provided by the radio base station 100 or previously defined thresholds.

Note that, if the threshold is not provided, the radio terminal 10 may omit acquisition (i.e., reception or measurement) of information to which the threshold is not provided.

In the first embodiment, aforementioned various thresholds are an example of determination parameters (for example, RAN assistance parameters) for determining whether to perform the switching process for switching standby destination or connection destination between the mobile communication network and the wireless LAN. That is, determination parameters include one or more values selected from among the "$\text{Thresh}_{ServingOffloadWLAN,LowP}$", "$\text{Thresh}_{ServingOffloadWLAN,LowQ}$", "$\text{Thresh}_{ChUtilWLAN,Low}$", "$\text{Thresh}_{BackhRateDLWLAN,High}$", "$\text{Thresh}_{BackhRateULWLAN,High}$", "$\text{Thresh}_{BEACONSRSSI,High}$", "$\text{Thresh}_{ServingOffloadWLAN,HighP}$", "$\text{Thresh}_{ServingOffloadWLAN,HighQ}$", "$\text{Thresh}_{ChUtilWLAN,High}$", "$\text{Thresh}_{BackhRateDLWLAN,Low}$", "$\text{Thresh}_{BackhRateULWLAN,Low}$", and "$\text{Thresh}_{BEACONSRSSI,Low}$".

Furthermore, the determination parameters may include a predetermined period (TsteeringWLAN) for which the radio terminal should continue a state in which the first condition or the second condition is satisfied. Alternatively, the determination parameters may include a predetermined period (T350 timer value) to be retained by the radio terminal 10 when the radio terminal performs an offload process of switching standby destination or connection destination from the mobile communication network to the wireless LAN (described later).

There are dedicated parameters notified from the radio base station 100 to the radio terminal 10 individually, and broadcast parameters broadcasted from the radio base station 100 to radio terminals 10, as the determination parameters. The dedicated parameters are included in an RRC message (for example, RRC Connection Reconfiguration) transmitted from the radio base station 100 to the radio terminal 10, for example. The broadcast parameters are included in a SIB (for example, WLAN-OffloadConfig-r12) broadcasted from the radio base station 100 to the radio terminal 10, for example. Note that, if the radio terminal 10 receives the dedicated parameters in addition to the broadcast parameters, the radio terminal 10 preferentially applies the dedicated parameters rather than the broadcast parameters.

(Radio Terminal)

Figure 2:
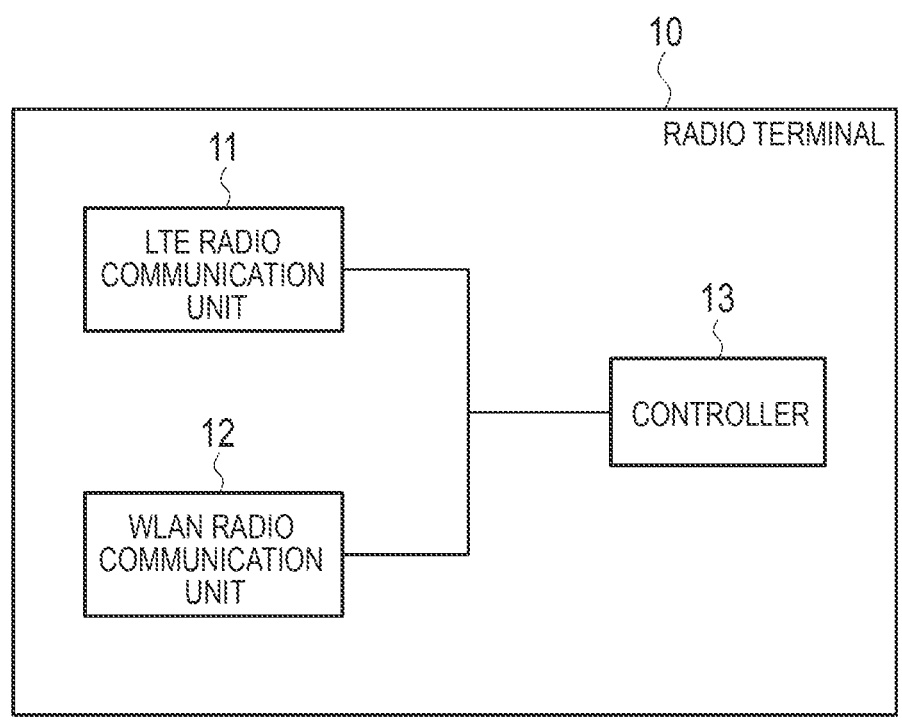
FIG. 2 is a block diagram illustrating a radio terminal 10 according to each embodiment.

Hereinafter, a radio terminal according to the first embodiment will be described. FIG. 2 is a block diagram illustrating the radio terminal 10 according to the first embodiment.

As illustrated in FIG. 2, the radio terminal 10 includes a LTE radio communication unit 11 (transceiver/transmitter/receiver), a WLAN radio communication unit 12 (transceiver/transmitter/receiver), and a controller 13 (controller).

LTE radio communication unit 11 has a function of performing radio communications with the radio base station 100, and consists of a radio transceiver, for example. For example, LTE radio communication unit 11 periodically receives a reference signal from the radio base station 100. The LTE radio communication unit 11 periodically measures a received level of reference signal (RSRP) and a received quality of reference signal (RSRQ). The LTE radio communication unit 11 receives dedicated parameters and broadcast parameters from the radio base station 100 as the determination parameters.

The WLAN radio communication unit 12 has a function of performing radio communications with the access point 200, and consists of a radio transceiver, for example. For example, the WLAN radio communication unit 12 receives a beacon or probe response from the access point 200. The beacon or probe response includes a BBS Load information element. The channel utilization value of the wireless LAN (ChannelUtilizationWLAN) can be acquired from the BBS Load information.

The WLAN radio communication unit 12 receives a response (GAS Response) replied from the access point 200 in response to a request (GAS (Generic Advertisement Service) Request) to the access point 200. The response (GAS Response) includes a wireless LAN downlink backhaul value (BackhaulRateDlWLAN) and a wireless LAN uplink backhaul value (BackhaulRateUlWLAN). Such an inquiry procedure is performed according to an ANQP (Access Network Query Protocol) defined by WFA (Wi-Fi Alliance) Hotspot2.0.

The WLAN radio communication unit 12 receives a signal from access point 200. The WLAN radio communication unit 12 measures a signal level of received signal (RSSI). The signal level of received signal (RSSI) is a signal strength of the beacon or probe response.

The controller 13 consists of a CPU (processor) and memory etc., and controls the radio terminal 10. To be more specific, the controller 13 controls the LTE radio communication unit 11 and the WLAN radio communication unit 12. Moreover, if the state in which the first information of mobile communication network satisfies the first condition and the second information of wireless LAN satisfies the second condition continues over a predetermined period, the controller 13 executes the switching process for switching standby destination or connection destination between the mobile communication network and the wireless LAN.

In the first embodiment, if the controller 13 performs an on-load process (or re-offload process) of switching standby destination or connection destination from the wireless LAN to the mobile communication network after performing an offload process of switching standby destination or connection destination from the mobile communication network to the wireless LAN, the controller 13 discards the dedicated parameters.

Particularly, the controller 13 is configured to retain the dedicated parameters during a period (T350 timer value) in which a predetermined timer (aforementioned T350 timer) is operating, in principle. The radio terminal 10 starts the predetermined timer when transitioning to an idle state due to the offload process. In other words, the controller 13 is configured to discard the dedicated parameters in response to an expiry of the predetermined timer or a stop of the predetermined timer.

(Radio Base Station)

Figure 3:
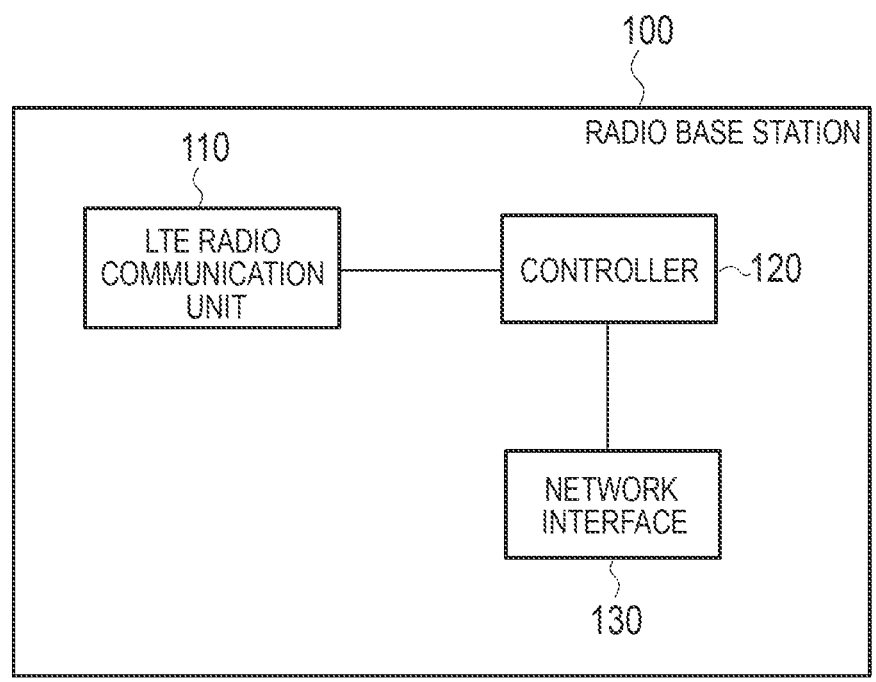
FIG. 3 is a block diagram illustrating a radio base station 100 according to each embodiment.

Hereinafter, a radio base station according to the first embodiment will be described. FIG. 3 is a block diagram illustrating the radio base station 100 according to the first embodiment.

As illustrated in FIG. 3, the radio base station 100 includes a LTE radio communication unit 110 (transceiver/transmitter/receiver), a controller 120 (controller), and a network interface 130.

The LTE radio communication unit 110 has a function of performing radio communications with the radio terminal 10. For example, the LTE radio communication unit 110 periodically transmits a reference signal to the radio terminal 10. The LTE radio communication unit 110 consists of radio transceiver, for example. The LTE radio communication unit 110 transmits dedicated parameters and broadcast parameters to the radio terminal 10 as the determination parameters. As described above, the LTE radio communication unit 110 notifies the radio terminal 10 of the dedicated parameters by an RRC message (for example, RRC Connection Reconfiguration), and notifies the radio terminal 10 of the broadcast parameters by a SIB (for example, WLAN-OffloadConfig-r12).

The controller 120 consists of a CPU (processor) and memory etc., and controls the radio base station 100. To be more specific, the controller 120 controls the LTE radio communication unit 110 and the network interface 130. Note that the memory included in the controller 120 may function as a storage unit. Another memory functioning as a storage unit may be provided other than the memory included in the controller 120.

The network interface 130 is connected with neighbor base stations via an X2 interface, and connected with MME/S-GW via an S1 interface. The network interface 130 is used for communications performed via the X2 interface and communications performed via the S1 interface. Moreover, the network interface 130 may be connected with the access point 200 via a predetermined interface. The network interface 130 is used for communications with the access point 200.

(Determination of Switching Process)

Hereinafter, the determination of a switching process will be described by assuming an example of a switching process from the mobile communication network to the wireless LAN.

Firstly, a method for determining whether a state in which the first information satisfies the first condition continues over a predetermined period (TsteeringWLAN) will be described. The first information is a measurement result (RSRPmeas) of a signal level of reference signal (RSRP) or a measurement result (RSRQmeas) of a signal quality of reference signal (RSRQ). The reference signal is periodically received at a short cycle, and the RSRPmeas or RSRQmeas is measured at a relatively short cycle. That is, the RSRPmeas or RSRQmeas is continuously acquired in a time axis direction.

Secondly, a method for determining whether a state in which the second information satisfies the second condition continues over a predetermined period (TsteeringWLAN) will be described. There is no rule about a cycle of acquiring the second information. That is, the second information (for example, BackhaulRateDlWLAN or BackhaulRateUlWLAN) is discretely acquired in a time axis direction.

(Operation According to First Embodiment)

Figure 4:
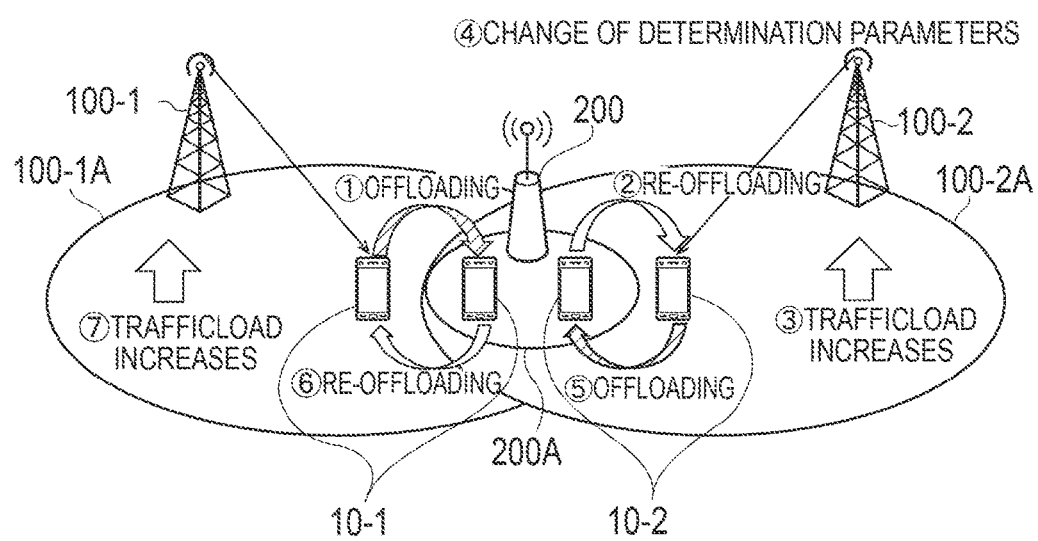
FIG. 4 is a diagram illustrating a ping-pong phenomenon.
Figure 5:
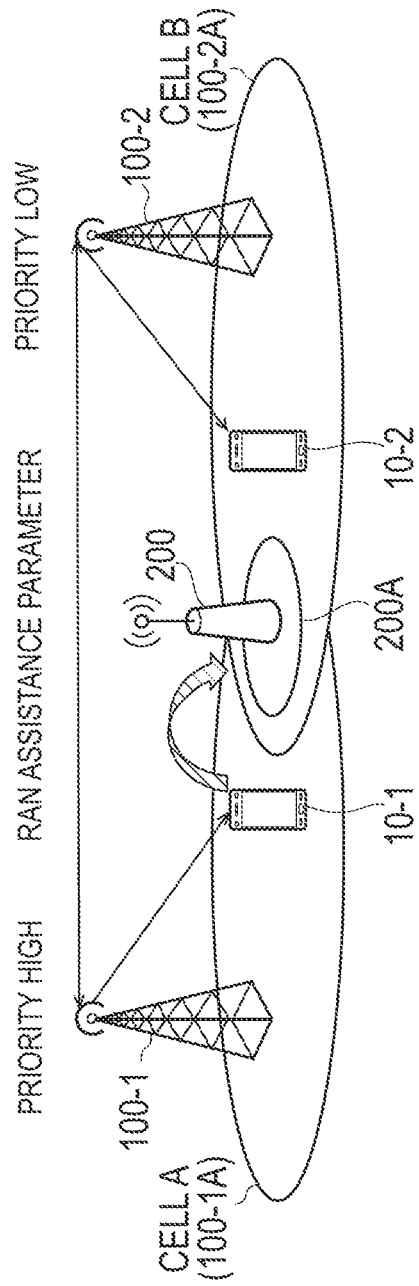
FIG. 5 is a diagram illustrating an operation environment according to a present embodiment.
Figure 6:
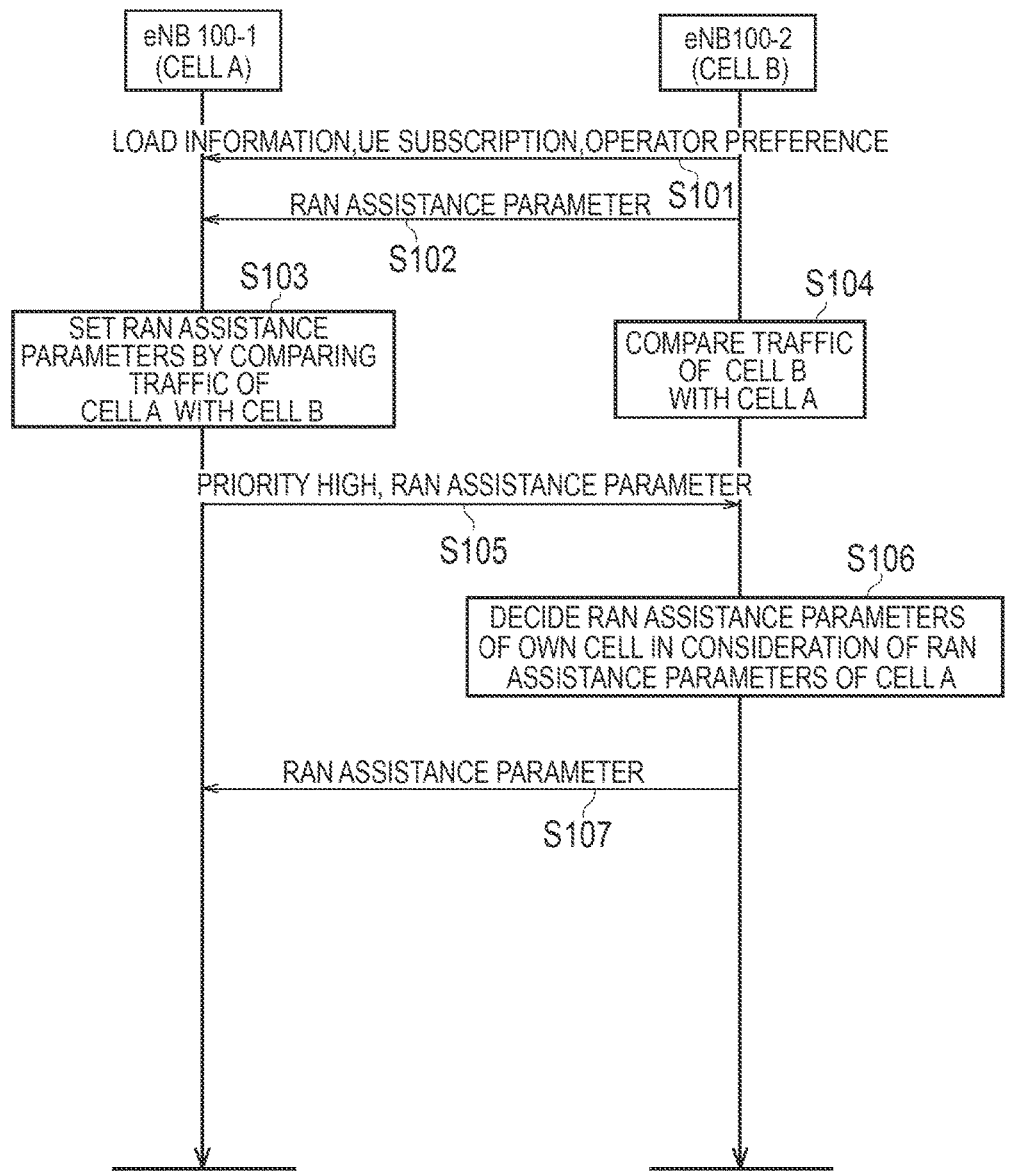
FIG. 6 is a sequence diagram illustrating an operation according to a present embodiment.

Next, an operation according to the first embodiment will be described by using FIGS. 4 to 6. FIG. 4 is a diagram illustrating a ping-pong phenomenon. FIG. 5 is a diagram illustrating an operation environment according to the present embodiment. FIG. 6 is a sequence diagram illustrating an operation according to the present embodiment.

As illustrated in FIG. 4, a first coverage area 100-1A of a cell (Cell A) managed by the radio base station 100-1 overlaps with a first coverage area 100-2A of a cell (Cell B) managed by the radio base station 100-2. In addition, a second coverage area 200A of an access point 200 exists in an overlapping portion between the first coverage area 100-1A and the first coverage area 100-2A. That is, the access point 200 exists in the overlapping portion of the first coverage areas. Note that the second coverage area 200A may partially overlap with the overlapping portion between the first coverage area 100-1A and the first coverage area 100-2A.

The radio terminal 10-1 exists in the first coverage area 100-1A. The "exists in" may be a standby state (RRC idle state) for the cell (Cell A) managed by the radio base station 100-1, or may be a connected state (RRC connected state) connected to the cell (Cell A) managed by the radio base station 100-1.

Here, it is assumed that the radio base station 100-1 changes determination parameters such that it becomes difficult for the radio terminal 10 to connect to the radio base station 100-1 (Cell A) in order to reduce the load of the radio base station 100-1. The radio base station 100-1 transmits the changed determination parameters to the radio terminal 10-1.

The radio terminal 10-1 connected to the radio base station 100-1 switches a connection destination to the wireless LAN based on the changed determination parameters. To be more specific, the radio terminal 10-1 connects to the access point 200.

A radio terminal 10-2, in which the communication status becomes worse due to the connection by the radio terminal 10-1 to the access point 200, switches the connection destination to the mobile communication network based on determination parameters stored in the radio terminal 10-2. To be more specific, the radio terminal 10-2 connects to the radio base station 100-2.

The load (Traffic load) in the radio base station 100-2 increases due to the connection of the radio terminal 10-2. Thereby, the radio base station 100-2 changes determination parameters such that it becomes difficult for the radio terminal 10 served by the radio base station 100-2 to connect to the radio base station 100-2. The radio base station 100-2 transmits the changed determination parameters to the radio terminal 10-2 served by the radio base station 100-2.

The radio terminal 10-2 connected to the radio base station 100-2 switches the connection destination to the wireless LAN based on the changed destination parameters. To be more specific, the radio terminal 10-2 connects to the access point 200.

A radio terminal 10-1, in which the communication status becomes worse due to the connection by the radio terminal 10-2 to the access point 200, switches the connection destination to the mobile communication network based on determination parameters stored in the radio terminal 10-1. To be more specific, the radio terminal 10-1 connects to the radio base station 100-1.

The load (Traffic load) in the radio base station 100-1 increases due to the connection of the radio terminal 10-1. Thereby, the radio base station 100-1 changes determination parameters such that it becomes more difficult for the radio terminal 10 served by the radio base station 100-1 to connect to the radio base station 100-1. The radio base station 100-1 transmits the changed determination parameters to the radio terminal 10-1.

The radio terminal 10-1 connected to the radio base station 100-1 switches the connection destination to the wireless LAN based on the changed destination parameters. To be more specific, the radio terminal 10-1 connects to the access point 200.

By repeating such a sequence of operations, an inefficient operation (so-called, ping-pong phenomenon), in which the radio terminal 10 alternately repeats the switching of standby destination or connection destination between the mobile communication network and the wireless LAN, may occur.

In order to resolve the ping-pong phenomenon, in the present embodiment, the radio base station 100-2 sets determination parameters of the radio base station 100-2 in consideration of determination parameters that are set in the radio base station 100-1. Thereby, each radio base station 100 (radio base station 100-1 and radio base station 100-2) does not set determination parameters independently. Therefore, it is possible to suppress that both of the radio base station 100-1 and the radio base station 100-2 set determination parameters such that it becomes difficult to connect to each of the radio base station 100-1 and 100-2. As a result, ping-pong phenomenon can be reduced.

Hereinafter, an example of detailed operation according to the present embodiment will be described.

As illustrated in FIG. 5, a radio base station 100-1 (eNB 100-1) manages a Cell A. A radio base station 100-2 (eNB 100-2) manages a Cell B. A second coverage area 200A of an access point 200 exists in overlapping portion between the first coverage area 100-1A of the Cell A and the first coverage area 100-2A of the Cell B. In FIG. 5, the priority of determination parameters of the radio base station 100-1 (eNB 100-1) is in high state (Priority High). The priority of determination parameters of the radio base station 100-2 (eNB 100-2) is in low state (Priority Low). Therefore, each radio base station 100 (eNB 100) sets determination parameters (RAN Assistance parameters) based on the priority of the each radio base station. In other words, the radio base station 100-1 (eNB 100-1) more preferentially sets determination parameters than the radio base station 100-2 (eNB 100-2) does. Details of setting the determination parameters will be described later.

As illustrated in FIG. 6, in step S101, the radio base station 100-1 transmits, to the radio base station 100-2, information which is related to the radio base station 100-1 and which is used for determining the priority of determination parameters. Similarly, the radio base station 100-2 transmits, to the radio base station 100-1, information related to the radio base station 100-2.

The information related to each of the radio base station 100-1 and 100-2 includes at least one information of load information (Load information), subscriber information (UE subscription), and operator setting information (operator configuration) of each of the radio base station 100-1 and 100-2, for example. The load information is information indicating the load in each of the radio base station 100-1 and 100-2. For example, load information is information indicating a traffic or utilization rate of radio resources etc. The subscriber information is information related to contents of contract between the user of the radio terminal 10 and the operator. To be more specific, the subscriber information is information related to contract of the radio terminal 10 (for example, fee related information etc.). The contract includes contract plan, contract service, contract fee, and charging status etc. for example. The operator setting information is information indicating a radio base station 100 by which the operator priorities. For example, the operator setting information is information indicating that a radio base station 100 managing a macro cell is prioritized than a radio base station 100 managing a small cell. Alternatively, the operator setting information may be a list of identifiers of prioritized radio base stations 100 (for example, identifiers of radio base stations 100 to which determination parameters are configured so as to aggressively perform the offload process.

In step S102, the radio base station 100-2 transmits determination parameters (RAN assistance parameter) set in the radio base station 100-2, to the radio base station 100-1.

In step S103, the radio base station 100-1 decides determination parameters and the priority of determination parameters. Here, the priority of determination parameters are values providing an index as to whether the radio base station 100-1 can preferentially set the determination parameters than another base station. The priority of determination parameters may be information of an absolute priority of determination parameters (for example, value of 0~100, or high to low). The priority of determination parameters may be information of relative priority of determination parameters (for example, the radio base station 100-1 has higher priority than the radio base station 100-2).

For example, the radio base station 100-1 decides the priority of determination parameters by means of any one of the following methods.

In a first method, the radio base station 100-1 decides the priority of determination parameters based on the load information of the radio base station 100-1 and the load information of the radio base station 100-2. For example, the radio base station 100-1 decides that determination parameters of a Cell (radio base station) having high load are prioritized than determination parameters of a Cell (radio base station) having low load.

In a second method, the radio base station 100-1 decides the priority of determination parameters based on subscriber information. For example, the radio base station 100-1 decides that determination parameters of a Cell (radio base station) having many radio terminals 10 paying fees of a predetermined value or more are prioritized than determination parameters of a Cell (radio base station) having few radio terminals 10 paying fees of the predetermined value or more.

In a third method, the radio base station 100-1 decides the priority of determination parameters based on operator setting information. For example, the radio base station 100-1 decides that determination parameters of a cell corresponding to a radio base station 100 prioritized by the operator are prioritized than determination parameters of other cells.

In the present embodiment, it is assumed that the radio base station 100-1 determines that the load of Cell A is higher than the load of Cell B by comparing load information of Cell A (a cell of the radio base station 100-1) with load information of Cell B. Therefore, the radio base station 100-1 decides that the determination parameters of the Cell A are prioritized than the determination parameters of the Cell B.

The radio base station 100-1 sets (decides) determination parameters because the radio base station 100-1 decides that the determination parameters of the Cell A have a higher priority than the determination parameters of the Cell B. Alternatively, the radio base station 100-1 maintains previously set determination parameters without change. Therefore, the radio base station 100-1 sets the determination parameters of the Cell A without considering the determination parameters of the Cell B. The radio base station 100-1 sets the determination parameters such that it becomes difficult to connect to Cell A, for example. That is, the determination parameters are parameters prompting a switch to the wireless LAN. For example, the radio base station 100-1 sets higher thresholds related to the first information of mobile communication network in the offload process (than the first predetermined value). Alternatively, the radio base station 100-1 sets lower thresholds related to the second information of wireless LAN in the offload process (than the second predetermined value).

The radio base station 100-1 may acquire load information of the access point 200 within a cell of the radio base station 100-1, and decide the determination parameters of the Cell A based on the acquired load information. For example, the radio base station 100-1 can set parameters for prompting a switch to the wireless LAN as the determination parameters if the load of the access point 200 is low. The radio base station 100-1 can set parameters for refraining from a switch to the wireless LAN as the determination parameters if the load of the access point 200 is high.

The radio base station 100-2 may decides the determination parameters of the Cell A based on (only) load information of the access point 200 existing in the overlapping portion between Cell A and Cell B among access points 200 within a cell of the radio base station 100-2. A method for discovering an access point 200 existing in the overlapping portion between Cell A and Cell B will be described in the second embodiment.

In step S104, the radio base station 100-2 decides the priority of determination parameters, similar to the radio base station 100-1. Note that the radio base station 100-2 may not decide the priority of determination parameters of the radio base station 100-2 (Cell B) at this step. The radio base station 100-2 may decide the priority of determination parameters of the radio base station 100-2 (Cell B) based on the priority of determination parameters of the radio base station 100-1 (Cell A) notified from the radio base station 100-1 in step S105 described later. For example, the radio base station 100-2 may decide that the priority of determination parameters of the radio base station 100-2 (Cell B) is low (Priority Low) if the priority of determination parameters of the radio base station 100-1 (Cell A) is high (Priority High). In this case, in step S101, the radio base station 100-2 may not acquire information related to the base station (radio base station 100-1) from the radio base station 100-1. The radio base station 100-2 may decide the determination parameters of the radio base station 100-2 (Cell B) based on the determination parameters of the radio base station 100-1 (Cell A) and the priority of on the determination parameters of the radio base station 100-1 (Cell A) that are notified from the radio base station 100-1, without deciding the priority of determination parameters of the radio base station 100-2 (Cell B).

In the present embodiment, the radio base station 100-2 does not set the determination parameters because the priority of determination parameters of the Cell A is higher than the priority of determination parameters of the Cell B. Alternatively, the radio base station 100-2 maintains previously set determination parameters without change.

In step S105, the radio base station 100-1, which retains the determination parameters having high priority, transmits determination parameters set in the radio base station 100-1 to the radio base station 100-2.

The radio base station 100-1 transmits, to the radio base station 100-2, information indicating the priority of determination parameters, together with the determination parameters. In the present embodiment, the information indicating the priority of determination parameters is information (Priority High) indicating that the priority of determination parameters of the Cell A is higher than that of determination parameters of the Cell B. Note that the radio base station 100-1 may transmit the priority of determination parameters (relative priority of determination parameters) only if the determination parameters of a cell of the radio base station 100-1 (the radio base station 100-1) are prioritized than determination parameters of another cell (another radio base station). Thereby, it is possible to reduce the occurrence of situation in which traffic increases and priority information of determination parameters conflicts when a plurality of radio base stations 100 transmit, to another radio base station, the priority of determination parameters of each of the plurality of radio base stations 100 (priority is high or low).

In the aforementioned embodiment, the radio base station 100-1 transmits priority (Priority High) of determination parameters to the radio base station 100-2, but it is not limited to this. For example, each of the radio base station 100-1 and 100-2 may decide the priority of determination parameters of each of the radio base station 100-1 and 100-2 based on information related to another radio base station obtained from the another radio base station, and decides the determination parameters of each of the radio base station 100-1 and 100-2 in consideration of determination parameters of the another radio base station.

Moreover, the radio base station 100-1 may transmit timer information indicating duration of the priority of determination parameters together with information indicating the priority. If the timer indicating duration of the priority expires, the priority of determination parameters of the Cell A for determination parameters of the Cell B becomes invalid.

In step S106, the radio base station 100-2 sets (decides) the determination parameters of Cell B in consideration of determination parameters of the Cell A because the priority (Priority High) of determination parameters received from the radio base station 100-1 indicates that the determination parameters of the Cell A have a higher priority than the determination parameters of the Cell B.

If the determination parameters of the Cell A are parameters prompting a switch to the wireless LAN, the radio base station 100-2 sets parameters refraining from a switch to the wireless LAN as the determination parameters of the Cell B. For example, the radio base station 100-2 sets lower thresholds related to the first information of mobile communication network in the offload process (than the first predetermined value). Alternatively, the radio base station 100-1 sets higher thresholds related to the second information of wireless LAN in the offload process (than the second predetermined value).

If the determination parameters of the Cell A are parameters refraining from a switch to the wireless LAN, the radio base station 100-2 sets parameters prompting a switch to the wireless LAN or parameters refraining from a switch to the wireless LAN as the determination parameters of the Cell B. In this case, the possibility of an occurrence of the ping-pong phenomenon is low because the radio terminal 10 within the area of the radio base station 100-1 refrains from an offload to the wireless LAN. Therefore, the radio base station 100-2 may set any parameters (the radio base station 100-2 may set parameters prompting a switch to the wireless LAN or parameters refraining from a switch to the wireless LAN).

Note that the radio base station 100-2 may recognize prioritized determination parameters by the comparison in step S104 in relation to the priority of determination parameters. Alternatively, the radio base station 100-2 may recognize prioritized determination parameters based on information indicating the priority of determination parameters from the radio base station 100-1.

Note that the radio base station 100-2 may set the determination parameters of Cell B in consideration of the determination parameters of the Cell A if the access point 200 exists in overlapping portion between the Cell A and Cell B.

In step S107, the radio base station 100-2 transmits the set determination parameters of the radio base station 100-2 (Cell B) to the radio base station 100-1. This step S107 may be omitted.

Then, the radio base station 100-1 notifies the set determination parameters of the Cell A to the radio terminal 10-1 within the Cell A. The radio base station 100-2 notifies the set determination parameters of the Cell B to the radio terminal 10-2 within the Cell B.

Note that the radio base station 100-1 may acquire load information of the access point 200, and determine whether the determination parameters are set appropriately. That is, radio base station 100-1 may determine whether the occurrence of ping-pong phenomenon can be reduced by setting the determination parameters. For example, the radio base station 100-1 may determine that the determination parameters are set appropriately if the variation of load of the access point 200 is within a certain range. Otherwise, the radio base station 100-1 may change the determination parameters. Alternatively, the radio base station 100-1 may transmit an instruction for changing the determination parameters, to radio base station 100-2.

Alternatively, the radio base station 100-2 may determine whether the determination parameters are set appropriately based on load information of the access point 200. Based on the result of determination, the radio base station 100-2 may request, to the radio base station 100-1 to which the determination parameters having high priority are set, the change of determination parameters.

(Operation of Radio Base Station 100)

Next, an example of operation of the radio base station 100 will be described by using FIG. 7. FIG. 7 is a flowchart illustrating an example of operation of the radio base station 100 according to the present embodiment.

In step S201, the radio base station 100 exchanges information related to the radio base station 100 such as load information and determination parameters, with a neighbor base station 100.

In step S202, the radio base station 100 compares determination parameters of each of the neighbor cell of the neighbor base station 100 and a cell of the radio base station 100 with thresholds. Here, the thresholds are thresholds for determining whether the determination parameters are determination parameters for prompting a switch to the wireless LAN. That is, if the determination parameters are higher than (or lower than) the thresholds, the radio base station 100 determines that the determination parameters are parameters for prompting a switch to the wireless LAN. On the other hand, if the determination parameters are lower than (or higher than) the thresholds, the radio base station 100 determines that the determination parameters are parameters for refraining from a switch to the wireless LAN. The details of the determination will be described later in step S203. To be more specific, the thresholds are at least one specific value of RSRPmeas and RSRQmeas in the mobile communication network, and/or at least one specific value of ChannelUtilizationWLAN, BackhaulRateDlWLAN, BackhaulRateUlWLAN, and RSSI in the wireless LAN.

Note that, in step S202, the radio base station 100-1 may compare determination parameters of cell (neighbor cell) of the neighbor base station 100 with determination parameters of a cell of the radio base station 100-1. To be more specific, the radio base station 100-1 may determine whether each of determination parameters is within a predetermined value. Thereby, the radio base station 100-1 can determine each of the determination parameters are similar to each other. That is, the radio base station 100-1 can determine there is a possibility that each of the determination parameters are parameters for prompting a switch to the wireless LAN. Therefore, the radio base station 100-1 may execute the step S204 if each of determination parameters is within a predetermined value.

In step S203, the radio base station 100 determines whether both determination parameters are parameters for prompting a switch to the wireless LAN, based on the result of comparison in step S202. The radio base station 100 may determine whether both of the loads of its cell and neighbor cell are higher than a threshold.

The radio base station 100 executes the process of step S201 if it does not determine that the both of the determination parameters are not the parameters for prompting a switch to the wireless LAN. On the other hand, the radio base station 100 executes the process of step S204 if it determines that the both of the determination parameters are the parameters for prompting a switch to the wireless LAN.

In step S204, the radio base station 100 compares load information of its cell with load information of the neighbor cell. The radio base station 100 may compare subscriber information of its cell with subscriber information of the neighbor cell. The radio base station 100 may compare operator information of its cell with operator information of the neighbor cell. The radio base station 100 may compare load information, subscriber information, and operator information of its cell with load information, subscriber information, and operator information of the neighbor cell.

In step S205, the radio base station 100 determines whether the load of its cell is higher than the load of neighbor cell. The radio base station 100 executes the process of step S206 if it determines that the load of its cell is higher than the load of neighbor cell. The radio base station 100 ends the procedure if it determines that the load of its cell is lower than the load of neighbor cell.

Alternatively, the radio base station 100 may executes the process of step S206 if it determines that the number of radio terminals 10 existing in a cell of the radio base station 100 and having high contract fees is larger than that of neighbor cell, based on the subscriber information.

In this way, in step S205, the radio base station 100 compares load information, subscriber information, and operator information of its cell with those of the neighbor cell, and determines a priority of the determination parameters of its cell (i.e., determines whether the radio base station 100 more preferentially sets the determination parameters of its cell than the determination parameters of the neighbor cell).

In step S206, the radio base station 100 decides the determination parameters of its cell because the priority of determination parameters of its cell is high (the determination parameters of its cell are prioritized over the determination parameters of the neighbor cell). In addition, the radio base station 100 notifies the neighbor base station 100 of the determination parameters of its cell together with information indicating that the priority of determination parameters of its cell is high.

[Second Embodiment]

Next, the second embodiment will be described. Differences with the first embodiment will be mainly described, and descriptions similar to the first embodiment will be omitted.

In the first embodiment, the radio base station 100 reduces the occurrence of ping-pong phenomenon by setting the determination parameters of its cell in consideration of the determination parameters of the neighbor cell based on the priority of determination parameters.

In the present embodiment, the radio base station 100 transmits, to a radio terminal 10, a list of access points 200 existing in a cell of the radio base station 100 (hereinafter, WLAN ID list). The radio base station 100 excludes, from the WLAN ID list, an identifier of access point 200 existing in an overlapping portion between a coverage area of the cell and a coverage area of the neighbor cell. Thereby, since it becomes difficult for the radio terminal 10 to discover the access point 200 existing in the overlapping portion, it is possible to reduce the occurrence of ping-pong phenomenon due to the access point 200 existing in the overlapping portion.

Hereinafter, the operation according to the second embodiment will be described. The operation environment according to the second embodiment is similar to the operation environment according to the first embodiment.

In the present embodiment, the radio base station 100 retains a WLAN ID list that is a list of access points 200 existing in a cell of the radio base station 100. The WLAN ID list may be a list of access points 200 to which the connection is recommended. The radio base station 100 transmits the retained WLAN ID list to the radio terminal 10. The radio base station 100 may broadcast a SIB including the WLAN ID list. The radio base station 100 may transmit an individual signaling (dedicated signaling) including the WLAN ID list, to each radio terminal 10.

The identifier of access point 200 included in the WLAN ID list is at least one of BSSID (Basic Service Set Identifier), HESSID (Homogenous Extended Service Set Identifier), and SSID (Service Set Identifier).

Firstly, the radio base station 100-1 transmits a WLAN ID list of a cell of the radio base station 100-1 (hereafter, first WLAN ID list) to a radio base station 100-2. Note that the radio base station 100-1 may transmit, to the radio base station 100-2, at least one of the identifiers of access points 200 existing in the first WLAN ID list. For example, the radio base station 100-1 may transmit an identifier of access point 200 existing in an overlapping portion between the cell and a cell of the radio base station 100-2 from among access points 200 existing in the first WLAN ID list.

Secondly, the radio base station 100-2 compares the first WLAN ID list from the radio base station 100-1 with a WLAN ID list of the cell of the radio base station 100-2 (hereafter, second WLAN ID list), and then determines whether an identifier of access point 200 commonly included in the first WLAN ID list and the second WLAN ID list exists. Since the WLAN ID list is a list of identifiers of access points 200 existing in the cell, an identifier of access point 200 commonly included in the first WLAN ID list and the second WLAN ID list corresponds to an identifier of access point 200 existing in the overlapping portion between the cell of radio base station 100-1 and the cell of radio base station 100-2. If an identifier of access point 200 commonly included in the first WLAN ID list and the second WLAN ID list exists, the radio base station 100-2 deletes the common identifier of access point 200 from the second WLAN ID list.

Alternatively, the radio base station 100-2 deletes the common identifier of access point 200 from the second WLAN ID list if the radio base station 100-1 (cell) is prioritized over the radio base station 100-2 (cell). The priority of radio base station 100 can be decided by a method similar to the first embodiment that describes the priority of determination parameters.

Thirdly, the radio base station 100-2 transmits the second WLAN ID list to a radio terminal 10 within a cell of the radio base station 100-2. Based on the identifier of access point 200 existing in the second WLAN ID list, the radio terminal 10 can execute the switching process of switching the standby destination or connection destination between the mobile communication network and the wireless LAN.

For example, if a radio terminal 10 can connect to only an access point 200 existing in the second WLAN ID list, a radio terminal 10 existing in a cell of the radio base station 100-1 can connect to an access point 200 existing in the overlapping portion of cells. However, a radio terminal 10 existing in a cell of the radio base station 100-2 cannot connect to an access point 200 existing in the overlapping portion of cells. As a result, it is possible to reduce the occurrence of ping-pong phenomenon.

Alternatively, in a case where an access point 200 existing in the WLAN ID list has higher priority over an access point 200 not existing in the WLAN ID list, the radio terminal 10 can connect to an access point 200 existing in the overlapping portion of cells only when the radio terminal 10 fails to discover an access point 200 existing in the WLAN ID list. As a result, it is possible to reduce the occurrence of ping-pong phenomenon.

[Other Embodiments]

As described above, the details of the present disclosure have been disclosed by using the embodiments of the present disclosure. However, it should not be understood that the description and drawings which constitute part of this disclosure limit the present disclosure. From this disclosure, various alternative embodiments, examples, and operation techniques will be easily found by those skilled in the art.

In the aforementioned first embodiment, it is possible for the radio base station 100 to discover an access point 200 existing in the overlapping portion between Cell A and Cell B as described in the second embodiment.

In the first embodiment, the information indicating the priority of determination parameters of the cell may be information indicating relative priority or information indicating absolute priority. For example, the radio base station 100 may transmit information indicating relative priority to another radio base station 100 in a case where two cells are compared. The radio base station 100 may transmit information indicating absolute priority to another radio base station 100 in a case where three cells are compared.

In a case where two cells are compared, a radio base station managing a high priority cell may transmit information indicating the priority to a radio base station managing a low priority cell, for example. Alternatively, only a radio base station managing a low priority cell may transmit information indicating the priority to a radio base station managing a high priority cell As an example of a case where three cells are compared, a case where load information of Cell A indicates a load of 40, load information of Cell B indicates a load of 50, and load information of Cell C indicates a load of 70 will be described. Here, it is assumed that a radio base station managing a high priority cell transmits information indicating the priority to a radio base station managing a low priority cell.

A radio base station 100-3 managing the Cell C determines that the load of Cell C is higher than the loads of other Cells. The radio base station 100-3 transmits information indicating the priority degree of a cell of the radio base station 100-3 as information indicating the priority, to a radio base station 100-1 managing the Cell A and a radio base station 100-2 managing the Cell B. To be more specific, the radio base station 100-3 transmits, to the radio base station 100-1, information indicating that Cell C is higher than Cell A by 30, as information indicating the priority. The radio base station 100-3 transmits, to the radio base station 100-2, information indicating that Cell C is higher than Cell B by 20, as information indicating the priority. Similarly, the radio base station 100-2 transmits, to the radio base station 100-1, information indicating that Cell B is higher than Cell A by 10, as information indicating the priority.

The radio base station 100-1 can know that the Cell A is lower than the Cell B by 20 and the Cell A is lower than the Cell C by 30. The radio base station 100-1 decides determination parameters of Cell A in consideration of these values. For example, the radio base station 100-1 can decides the determination parameters of the Cell A by preferentially considering the determination parameters of the Cell C over the determination parameters of the Cell B.

In the second embodiment, the radio base station 100 deletes an identifier of access point 200 commonly included in the first WLAN ID list and the second WLAN ID list (hereafter, common AP identifier), but it is not limited to this. For example, the radio base station 100 may transmit exclusion information for exclude the common AP identifier from the WLAN ID list retained in the radio terminal 10 within a cell of the radio base station 100. The exclusion information is a message including the common AP identifier. The radio terminal 10 that has received the exclusion information excludes, from the retained WLAN ID list, an AP identifier corresponding to the common AP identifier included in the exclusion information. Thereby, the radio terminal 10 cannot connect to the access point 200 existing in the overlapping portion of cells. As a result, it is possible to reduce the occurrence of ping-pong phenomenon. Note that the radio terminal 10 may delete the AP identifier that corresponds to the common AP identifier in the WLAN ID list used for the offload process, and maintain the AP identifier that corresponds to the common AP identifier in the WLAN ID list not used for the offload process.

Alternatively, the radio base station 100 may transmit setting information of specific determination parameters associated with the common AP identifier, to the radio terminal 10 within a cell of the radio base station 100. Alternatively, the radio base station 100 may transmit setting information of determination parameters associated with an AP identifier existing in the WLAN ID list other than the common AP identifier, to the radio terminal 10 within a cell of the radio base station 100. For example, for a normal access point 200 not existing in the overlapping portion of cells, the radio base station 100 may set parameters prompting a switch to the wireless LAN, as the specific determination parameters. Alternatively, for an access point 200 existing in the overlapping portion of cells, the radio base station 100 may set parameters refraining from a switch to the wireless LAN, as the specific determination parameters. Alternatively, radio base station 100 may perform the both operations. The radio base station 100 transmits the set specific determination parameters to the radio terminal 10.

In response to receiving the setting information of specific determination parameters, the radio terminal 10 uses the specific determination parameters to an access point corresponding to the AP identifier to which the specific determination parameters are set, and uses normal determination parameters to other access points. Thereby, the radio base station 100 can control an offload process to an access point 200 existing in the overlapping portion of cells. As a result, it is possible to reduce the occurrence of ping-pong phenomenon.

In each embodiment, the LTE is described as the mobile communication network, but the embodiments are not limited to this. The mobile communication network may be any network provided by communication carriers. Therefore, the mobile communication network may be UMTS (Universal Mobile Telecommunications System) or GSM (registered trademark).

The invention claimed is:

1. A system comprising:
   a base station included in a mobile communication network, the base station comprising:

a transmitter configured to transmit, to a radio terminal by a unicast signaling, a list including identifiers of wireless local area network (WLAN) access points to which the radio terminal is recommended to connect; and the radio terminal served by the base station, the radio terminal comprising:

a receiver configured to receive the list from the base station;

a memory electrically connected to a processor; and the processor configured to store the list in the memory, and to execute a process of connecting to a WLAN access point identified by an identifier included in the list;

wherein the transmitter is further configured to transmit exclusion information to the radio terminal, the exclusion information causing the radio terminal to delete one or more identifiers of particular WLAN access points from the list stored in the radio terminal, and the exclusion information including the one or more identifiers of the particular WLAN access points, the receiver is further configured to receive the exclusion information from the base station, the processor is further configured to delete the one or more identifiers of the particular WLAN access points from the list, in response to receiving the exclusion information, and after deleting the one or more identifiers of the particular WLAN access points from the list, the processor is further configured to execute a process of determining the identifier of a WLAN access point to connect by using the list from which the one or more identifiers of the particular WLAN access points are deleted, and by not using the received exclusion information.

2. The system according to claim 1, wherein the particular WLAN access points comprises a WLAN access point having a coverage area, and
at least a part of the coverage area overlaps an overlapping portion between a cell of the base station and a neighbor cell.

3. A radio terminal comprising:
a receiver configured to receive a list from a base station by a unicast signaling, the list including identifiers of wireless local area network (WLAN) access points to which the radio terminal is recommended to connect;
a memory electrically connected to a processor; and
the processor configured to store the list in the memory, and to execute a process of connecting to a WLAN access point identified by an identifier included in the list, wherein
the receiver is further configured to receive exclusion information from the base station, the exclusion information causing the radio terminal to exclude one or more identifiers of particular WLAN access points from the list stored in the radio terminal, and the exclusion information including the one or more identifiers of the particular WLAN access points,
the processor is further configured to delete the one or more identifiers of the particular WLAN access points from the list, in response to receiving the exclusion information, and
after deleting the one or more identifiers of the particular WLAN access points from the list, the processor is further configured to execute a process of determining the identifier of a WLAN access point to connect by using the list from which the one or more identifiers of the particular WLAN access points are deleted, and by not using the received exclusion information.

* * * * *